May 3, 1938.  A. H. BROWN  2,115,939
SUCTION VALVE FOR DENTURES
Filed Nov. 2, 1936
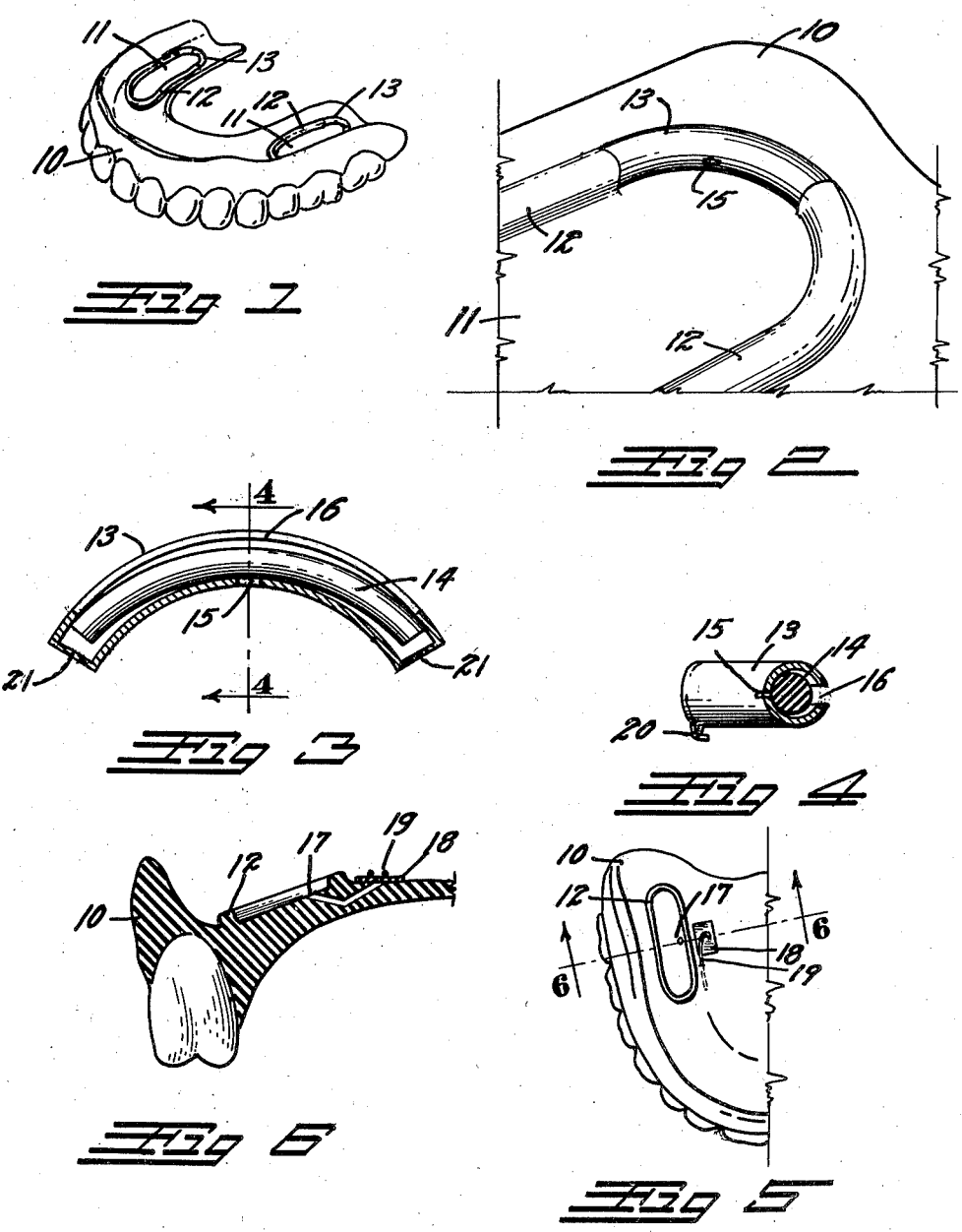
INVENTOR.
ARTHUR H. BROWN
BY
ATTORNEY.

Patented May 3, 1938

2,115,939

UNITED STATES PATENT OFFICE 2,115,939

SUCTION VALVE FOR DENTURES

Arthur H. Brown, Denver, Colo.

Application November 2, 1936, Serial No. 108,854

4 Claims. (Cl. 32—3)

This invention relates to an improved suction means for holding dentures and other dental appliances in place in the mouth.

The principal object of the invention is to provide a suction area on the fitting surface of the denture or other appliance in which a partial vacuum will be formed and maintained, to cause the denture to be firmly held against the mouth tissues.

Another object of the invention is to provide a highly efficient check valve mechanism which will allow the air to escape from the suction area when the denture is placed in position and which will effectively prevent the return of air to the area so as to maintain an effective partial vacuum therein.

A further object is to provide a check valve construction in which the valve element can be easily and economically renewed when necessary.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 illustrates a typical palateless denture with the invention applied thereto.

Fig. 2 is a greatly magnified view of a portion of Fig. 1, illustrating the position of the improved check valve in the denture.

Fig. 3 is an enlarged longitudinal section through the check valve mechanism.

Fig. 4 is a cross-section therethrough, taken on the line 4—4, Fig. 3.

Fig. 5 is a half-plan view of a typical denture, illustrating an alternate form of check valve.

Fig. 6 is a detail section through the alternate form, taken on the line 6—6, Fig. 5.

The invention is illustrated and described as applied to an upper denture. It is to be understood however that it is not limited to this particular use for it is equally applicable to both upper and lower dentures of all types as well as to other dental and orthodontic appliances.

In carrying out the objects of the invention I employ what will be hereinafter designated a suction pad, 11. That is, an area on the fitting surface of the denture outlined by a raised border or bead 12. The term "fitting surface" of the denture designates the surface thereof which has been fitted to and bears against the supporting tissues of the mouth.

The suction pad may have any desired size and shape depending upon the size and contour of the particular denture being fitted. In the usual palateless denture, such as illustrated in Fig. 1, two of the pads are employed positioned to fit against the surface of edentulous maxillary alveolar ridge. They can however be placed in any position found most suitable for the support of the particular denture or appliance in hand. The bead 12 may have any desired cross-sectional shape to provide a raised peripheral air-retaining border.

The preferred form of check-valve forms a portion of the bead 12. It comprises an arcuately curved tube 13 corresponding to the size of the bead 12. The extremities of the tube are sealed by means of end plates 21 from which suitable attachment hooks 20 project.

The concave or inner arcuate side of the tube 13 is provided with a relatively small valve port 15 at its midpoint. The convex or outer arcuate side of the tube is formed with a relatively long, longitudinally-extending slot 16.

A cylindrical rubber valve member 14 is positioned within the tube 13. The valve member 14 is a normally straight piece of rubber thread of less diameter than the inner diameter of the tube 13. The valve member 14 is placed in and removed from the tube 13 through the slot 16 which is narrower than the valve member so that after forcible insertion, the valve member is maintained in place.

The curvature of the tube 13 bends the valve member so that it is pressed by its natural resiliency against the port 15 to close the latter. When in place in the bead 12 the latter is brought against the ends 21 of the tube to form an air tight seal between the valve and the bead.

Let us assume that the denture 10 is placed in the mouth of the patient and pressed against the mouth tissues. This creates pressure within the pad bounded by the ridge or bead 12. The air, under pressure, is forced through the port 16 and in passing forces the flexible valve member 14 away from the port 15. After the air is exhausted, the valve member through its tendency to straighten again seals the port 16 to prevent the return of air, thus producing a partial vacuum in the suction pad 11, which acts to hold the denture firmly in place.

It is desired to call attention to the fact that there is but one movable part in the valve, that is, the valve member 14. This can be easily withdrawn through the slot 16 and replaced when necessary.

When in place the bead 12 imbeds itself in the mouth tissues to form a positive air tight seal. Any natural mouth fluids entrapped in the suction pad will also pass through the valve with the air to assist in the formation of the partial vacuum.

In Figs. 5 and 6, an alternate form of the valve is illustrated. In this form, the bead or border 12 of the suction pad is continuous throughout the entire periphery of the pad. A small passage 17 is formed through the material of the denture terminating on both sides of the bead thereof. On the outer side a rubber flap 18, held in place by means of a small flexible wire 19, closes the passage 17. The flap 18 acts as a check valve to allow the escape of air and fluids from within the pad and to prevent the return of air thereto similar to the valve previously described.

In some instances the flap-valve of Figs. 5 and 6 may be eliminated and the mouth tissue itself will act as a valve to close the outer end of the passage to prevent the return of air to the suction pad.

The bead 12 may be formed of the material of the denture as an integral part thereof or it may be placed upon the fitting surface and secured thereto in any suitable manner. For metallic dentures and appliances the pad could be formed by soldering a wire to the surface, the wire acting to outline and form the suction area.

While the valve mechanism of Figs. 3 and 4 is applied particularly to suction pads for dentures, it is of course not limited to this particular use but will be found useful wherever a check value of this nature is desired.

The hooked prongs 20 of the valve are imbedded in the denture material to hold the valve in place thereon. It can then be sealed to the fitting surface by means of any suitable cement or sealing compound, if necessary.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A check valve of the class described comprising: a metallic arcuate tube; a small valve port through the concave arcuate side of said tube; and a normally straight resilient member positioned within said tube so that the curve of the latter will flex said member to hold the latter against said valve port, there being an air passage communicating with the interior of said tube at a point spaced from said port.

2. A check valve for the suction pads of the class described comprising: a metallic arcuate tube; a small valve port through the concave arcuate side of said tube; and a longitudinally extending, normally straight resilient member positioned within said tube so that the curve of the latter will flex said member against said valve port, there being a slot through the side of said tube spaced from said port for the insertion and removal of said resilient member, said slot acting as an air passage.

3. Means for holding a denture in place in the mouth comprising: a peripheral raised bead enclosing an area on the rear face of said denture; an arcuately curved metallic tube forming a portion of said bead; a normally straight, resilient core of less diameter than said tube extending longitudinally within the latter so that the curvature of said tube will act to flex said core to cause the latter to contact the inner arcuate wall of said tube at its mid point and the outer arcuate wall of said tube at its extremities, there being a port closed by the contact at said mid-point.

4. A check valve comprising: a curved metallic tube having a port formed through the mid point of its inner concave wall and an air passage through its outer convex wall; and a normally straight, rubber core of less diameter than said tube extending longitudinally within the latter, the curvature of said tube acting to flex said core so as to press its mid-portion against said port.

ARTHUR H. BROWN.